US012193407B2

(12) United States Patent
Cheng et al.

(10) Patent No.: US 12,193,407 B2
(45) Date of Patent: Jan. 14, 2025

(54) SINGLE FACTOR MODELING-CONSTRAINT METHOD AND DEVICE FOR MICE CHRONIC FATIGUE SYNDROME

(71) Applicants: Wuhan university of science and technology, Wuhan (CN); Hubei Provincial Center for Disease Control and Prevention, Wuhan (CN)

(72) Inventors: Jing Cheng, Wuhan (CN); Jianbo Zhan, Wuhan (CN); Dan Li, Wuhan (CN); Xiang Zhong, Wuhan (CN); Ling Hu, Wuhan (CN); Tao Huang, Wuhan (CN); Guiping Wang, Wuhan (CN); Lin-Wanyue Chen, Wuhan (CN); Yutong Zhang, Wuhan (CN)

(73) Assignees: Wuhan university of science and technology, Wuhan (CN); Hubei Provincial Center for Disease Control and Prevention, Wuhan (CN)

( * ) Notice: Subject to any disclaimer, the term of this patent is extended or adjusted under 35 U.S.C. 154(b) by 0 days.

(21) Appl. No.: 18/504,768

(22) Filed: Nov. 8, 2023

(65) Prior Publication Data

US 2024/0156049 A1 May 16, 2024

(30) Foreign Application Priority Data

Nov. 16, 2022 (CN) .......................... 202211435648.2

(51) Int. Cl.
*A01K 1/06* (2006.01)
*A01K 1/03* (2006.01)

(52) U.S. Cl.
CPC ............ *A01K 1/0613* (2013.01); *A01K 1/031* (2013.01)

(58) Field of Classification Search
CPC ........ A01K 1/031; A01K 1/0613; A61D 3/00; A61B 2503/40
See application file for complete search history.

(56) References Cited

U.S. PATENT DOCUMENTS 3,739,751 A * 6/1973 Mohr ........................ A61D 3/00
                                                119/103
5,357,905 A * 10/1994 Gordon .................. A01K 15/02
                                                119/708
(Continued)

FOREIGN PATENT DOCUMENTS

| CN | 205902601 U | 1/2017 |
| CN | 209132949 U | 7/2019 |

(Continued)

*Primary Examiner* — Joshua J Michener
*Assistant Examiner* — Henry Hooper Mudd
(74) *Attorney, Agent, or Firm* — Nitin Kaushik

(57) ABSTRACT

The present invention belongs to animal experiments field, disclosed a single factor modeling-constraint method and device for mice chronic fatigue syndrome, the modeling-constraint method is specifically using mineral water bottle to restraint mice; the mineral water bottle is divided into upper, middle and lower parts; the body of mineral water bottle is uniformly drilled for mice to breathe; the inner of the mineral water bottle is blocked by a cardboard to reduce the move space of mice; cover the mice through the divided bottle; one end of the opening is tightly attach to the wall, the other end is tightly attach to the mice feeding box, and keeping 30 minutes to restraint. The present invention utilizes mineral water bottle to make three simple restraint tube, not only saves the costs of experiment, but also turns waste into treasure, which is a simple operation, and increases the possibility of the experiment.

4 Claims, 5 Drawing Sheets

(56) References Cited

U.S. PATENT DOCUMENTS

| | | | |
|---|---|---|---|
| 8,590,487 B1 * | 11/2013 | Goddard, Jr. .......... | A01K 29/00 119/417 |
| 2009/0000567 A1 * | 1/2009 | Hadjioannou ......... | A01K 15/04 119/755 |

FOREIGN PATENT DOCUMENTS

| | | |
|---|---|---|
| CN | 211131498 U | 7/2020 |
| CN | 215123091 U | 12/2021 |

* cited by examiner

SINGLE FACTOR MODELING-CONSTRAINT METHOD AND DEVICE FOR MICE CHRONIC FATIGUE SYNDROME

CROSS-REFERENCE TO RELATED APPLICATIONS

The application claims priority to Chinese patent application No. 2022114356482, filed on Nov. 16, 2022, the entire contents of which are incorporated herein by reference.

TECHNICAL FIELD

The present invention relates to animal experiments field, and especially relates to a single factor modeling-constraint method and device for mice chronic fatigue syndrome.

BACKGROUND

At present, in the single factor modeling experiment of chronic fatigue syndrome (CFS) with mice, which usually involved in mice restraint experiments. In the mice restraint experiments, the effect of mice restraint plays a crucial role in determining the success of modeling. When using the current technology and device to restraint mice, problems such as the difficulty of operation, easy escape of mice and scratched often occurred, which affect the efficiency and effect of mice restraint. Therefore, the preparation of restraint tools is important in mice restraint experiments.

At present, commonly used restrain methods are:

(1) Putting experimental mice in a restraint cage to restraint, but the tool can only restraint one mouse at a time, and the tool is expensive. When the number of experimental mice is too large, the required restraint tools also increase accordingly, which results cumbersome operations, time-consuming, laborious, and increasing costs.

(2) Using a urine collection-restraint tube, which is a length of 18-20 cm, the outer diameter of the tube is 6 cm, and the inner diameter is 5 cm. Put the head of the mice on the conical air vent at the front end of the tube to ensure it can breathe normally, then seal the tube with screws to prevent mice to escape. However, for mice of different length and size, the length of the restraint tube needs to be adjusted appropriately to ensure the effect of restraint; therefore, this method is cumbersome to operate, and improper operation can easily scratch the mice.

(3) Put the mice in a 50 ml centrifuge tube (punched dozens of vents in the centrifuge tube in advance), when the mouse enters the centrifuge tube, fill the remaining space with padding according to the size of the mouse; in order to limit the free movement of mice, and finally tighten the lid. Therefore, this method takes a long time, especially needs to increase or decrease the amount of padding according to the size of the mice; and it is difficult to make vents on the centrifuge tube, which is difficult to operate.

(4) Utilizing the characteristic of mice that like to drill holes, they are restrained in a narrow, hard plastic special cavity. This method needs to urge mice to get into the narrow cavity by itself, which is a difficult operation, time-consuming and laborious.

(5) Put mice in the restraint tube and adjust the size of the glass baffle to change the mice's activity space. When dealing with different size of mice, this method requires a fore and aft adjustment device, which is complex and difficult to operate.

Based on the above analysis, the problems and defects of the prior art are:

(1) Using the special tools such as restraint tube is expensive, and can only restraint one mouse at a time. When the number of experimental mice is increasing, the required tools is increasing accordingly, which results cumbersome operations and increasing costs.

(2) Using tools such as urine collection-restraint tube, restraint tube-bottle glass, which is difficult to effectively deal with different size of mice, and the operation is cumbersome and difficult to carry out.

(3) The current method needs to put mice in a smaller centrifuge tube, which is difficult to operate, time-consuming and laborious.

SUMMARY

Aiming at the existing problem of the prior art, the present invention provides a single factor modeling-constraint method and device for mice chronic fatigue syndrome.

The present invention is achieved in this way, a single factor modeling-constraint tool for mice chronic fatigue syndrome. The single factor modeling-constraint tool for mice chronic fatigue syndrome specifically using a mineral water bottle to restrain mice;

Mineral water bottle is divided into upper, middle and lower parts, which are part A, part B and part C respectively to restrain mice.

A body of mineral water bottle is equipped with holes uniformly for mice to breathe.

Further, a height of part A, part B and part C of mineral water bottle which in the first step are same.

Further, an inner of part A, part B and part C which are divided by the body of mineral water bottle is blocked by the cardboard, a baffle is set on a surface of the cardboard, the baffle is made from a special material (including an active infrared alarm device, specifically a pyroelectric infrared sensor, an alarm actively emits infrared rays, set a restraint time for 30 minutes through a computer software, and after boot up a program. If the bottle leaves the baffle, the infrared rays bounce back when encountering obstacles, which is received by a probe of the alarm and emits alarm) to reduce a moving space of mice, the obstacles refer to a hard surface, such as a wall, or a tabletop.

Further, the cardboard is equipped with holes for mice to breathe, and the cardboard can be formed into different shapes in the bottle, including quadrilateral, triangle, and rhombus.

Further, the part A, part B and part C are respectively placed on a same horizontal plane. One end of the part A, part B and part C is attached to the wall, the other end is attached to a mice feeding box.

Further, the wall and the mice feeding box using another baffles, which are made from special materials (same as the above-mentioned baffle used on the cardboard).

Another object of the present invention is to provide a single factor modeling-constraint device for mice chronic fatigue syndrome, includes: computer, special cardboard, baffles, and the mineral water bottle;

The working principle of the device is:

Turn on the cardboard and the baffle operation panel, and boot up the computer, set operation parameters. Cover the mice through the opening of the segmented part of the mineral water bottle and make it touch the baffle as much as possible. Control the computer to start a timing function, which is 30 minutes. After the timing starts, the computer controls the special material in the baffle to suck the plastic bottle to prevent mice to escape.

During a restraint period, the baffle plays monitoring and alarm function, and can remotely observe the restraint situation by computer. If the mouse breaks free, the baffle will promptly transmit the signal to computer to alarm. After 30 minutes of restraint is over, the computer receives signal, and to remind in time. At the same time, a binding between the baffle and the plastic bottle is dismissed, which can depart the plastic bottle and the baffle.

In combine with the above-mentioned, the advantages and positive effects of the technical solution of the present invention are:

The present invention using mineral water bottle to make simple restraint tube. Only one mineral water bottle can manufacture three simple restraint tube, which the experiment cost is low.

The present invention divides the mineral water bottle into three parts, which are upper, middle, and lower parts. The inside of the bottle is blocked by cardboard to restrain mice, which saves the time of mice drilling holes and adjusting the restrain tools according to different size of mice.

The present invention uses high-tech cardboard and baffle of special materials, which has the function of monitoring, timing, and alarming, etc. The material in the baffle can hold the plastic bottle tightly to prevent the mice to escape. The experimenter can operate through the computer and observe the restraint situation remotely, which can achieve better experiment effect.

The present invention improves the speed of experiment operation, increases the possibility of the experiment, and decrease the cost of the experiment. Utilizing mineral water bottle to make simple restraint tube, compared with other mice restraint methods, not only saves the costs of experiment, turns waste into treasure, but also saves the time of mice drilling holes and adjusting the restrain tools according to different size of mice, which is a simple operation and can be reused many times.

The expected income and the commercial value after the transformation of the technical solution of the present invention are: the present invention utilizing mineral water bottle to make simple restraint tube, which is a simple operation and the experimental tools can be reused many times. And it can be widely used in mice restraint experiment in the field of animal experiments, which plays a great role in the success of modeling and has great commercial value.

The technical solution of the present invention fills up the technical gap in the domestic and foreign industry: the present invention utilizing mineral water bottle to make simple restraint tube, using high-tech baffle to monitoring, timing, and alarming, which fills up the blank of high costs of restraint tools, cumbersome operation, time-consuming and laborious.

Whether the technical solution of the present invention overcomes the technical issue that people have been eager to solve, but have never been successfully: In the experiment of single factor modeling for mice chronic fatigue syndrome (CFS), it usually involves mice restraint experiments. In the mice restraint experiment, the effect of mice restraint plays a crucial role in the success of modelling. Therefore, in the mice restraint experiments, the preparation of restraint tools is very important. The present invention utilizes low-cost mineral water bottle to overcome the technical issue of the preparation of restraint tools in the mice restraint experiments.

Whether the technical solution of the present invention overcomes the technical prejudice: the commonly used mice restraint method has high costs, cumbersome operation, difficult to carry out, which greatly hinders the success rates of single factor modeling for mice chronic fatigue syndrome (CFS). The present invention utilizes mineral water bottle to make simple restraint cage, and uses high-tech cardboard and baffle to monitoring, timing, and alarming, which breaks the traditional technical prejudice and greatly improves the practical value of the present invention.

DETAILED DESCRIPTION OF THE EMBODIMENTS

To make the objectives, technical solutions and advantages of the present invention clearer, a detailed description will be given below, in combination with the embodiments. It should be understood that the specific embodiments are only used to explain the present invention, which are not used to limit the present invention.

To make the person skilled in the art fully understand how to implement the present invention, this section provides an explanation and implementation example of the technical solutions of the claims.

Embodiment 1

Figure 1:
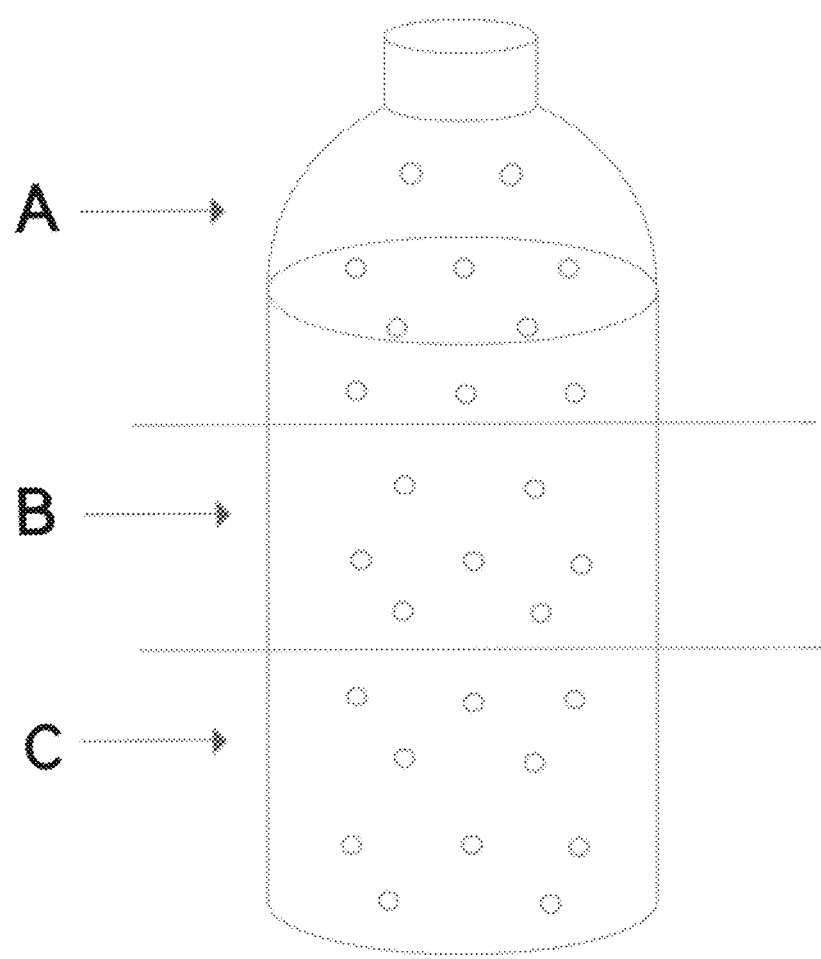
FIG. 1 is a structural schematic diagram provided by embodiment 1 of the present invention.

The embodiments of the present invention provide a single factor modeling-constraint method for mice chronic fatigue syndrome, which utilize mineral water bottle to restraint mice. The structure of the mineral water bottle as shown in FIG. 1:

The mineral water bottle is divided into upper, middle and lower parts, which are part A, part B and part C respectively to restraint mice.

The body of mineral water bottle is equipped with holes uniformly for mice to breathe.

Further, the height of part A, part B and part C of mineral water bottle which in the first step are same.

Embodiment 2

Figure 2:
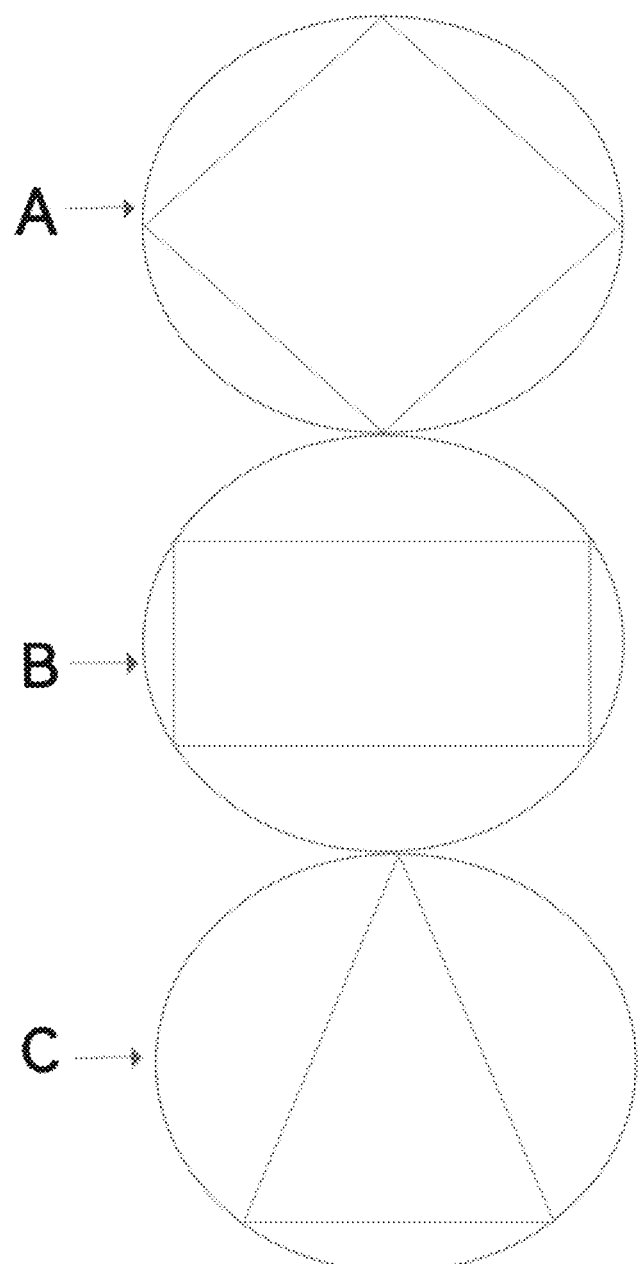
FIG. 2 is a structural schematic diagram provided by embodiment 2 of the present invention.

As shown in FIG. 2, the inner of part A, part B and part C which are divided by the body of mineral water bottle is blocked by the cardboard to reduce the moving space of mice.

Further, the cardboard is equipped with holes for mice to breathe, and the cardboard can be formed into different shapes in the bottle, including quadrilateral, triangle, and rhombus.

Embodiment 3

Figure 4:
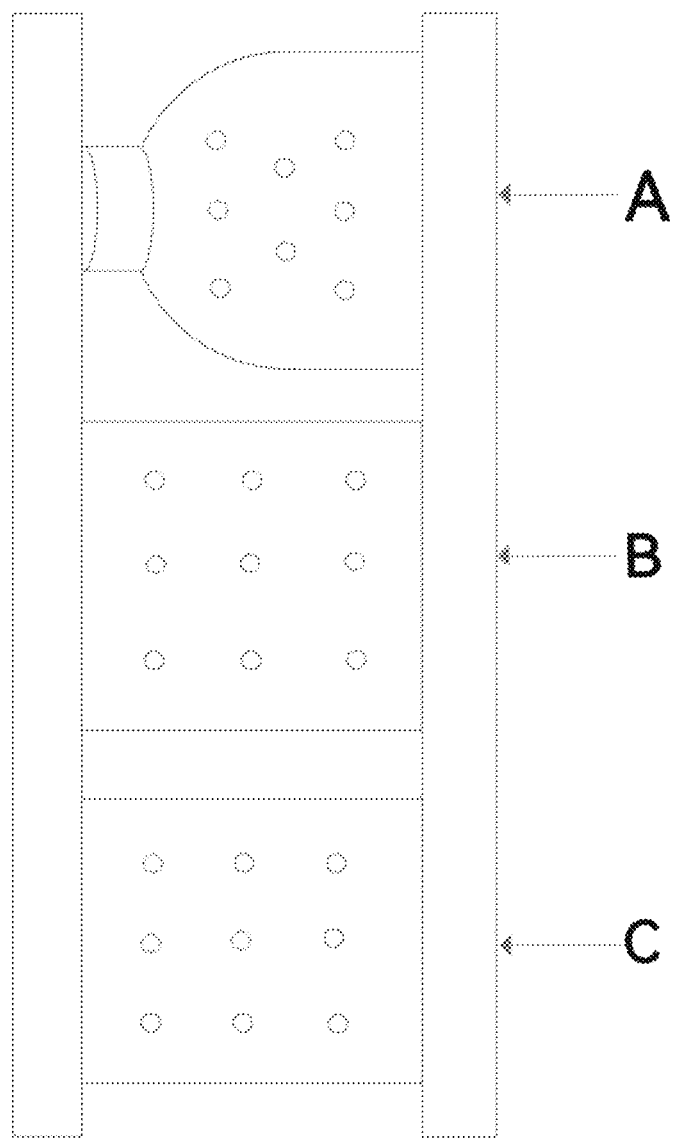
FIG. 4 is a structural schematic diagram provided by embodiment 3 of the present invention.

As shown in FIG. 4, the part A, part B and part C are respectively place on the same horizontal plane. One end of the part A, part B and part C is tightly attach to the wall, the other end is tightly attach to the mice feeding box.

Figure 3:
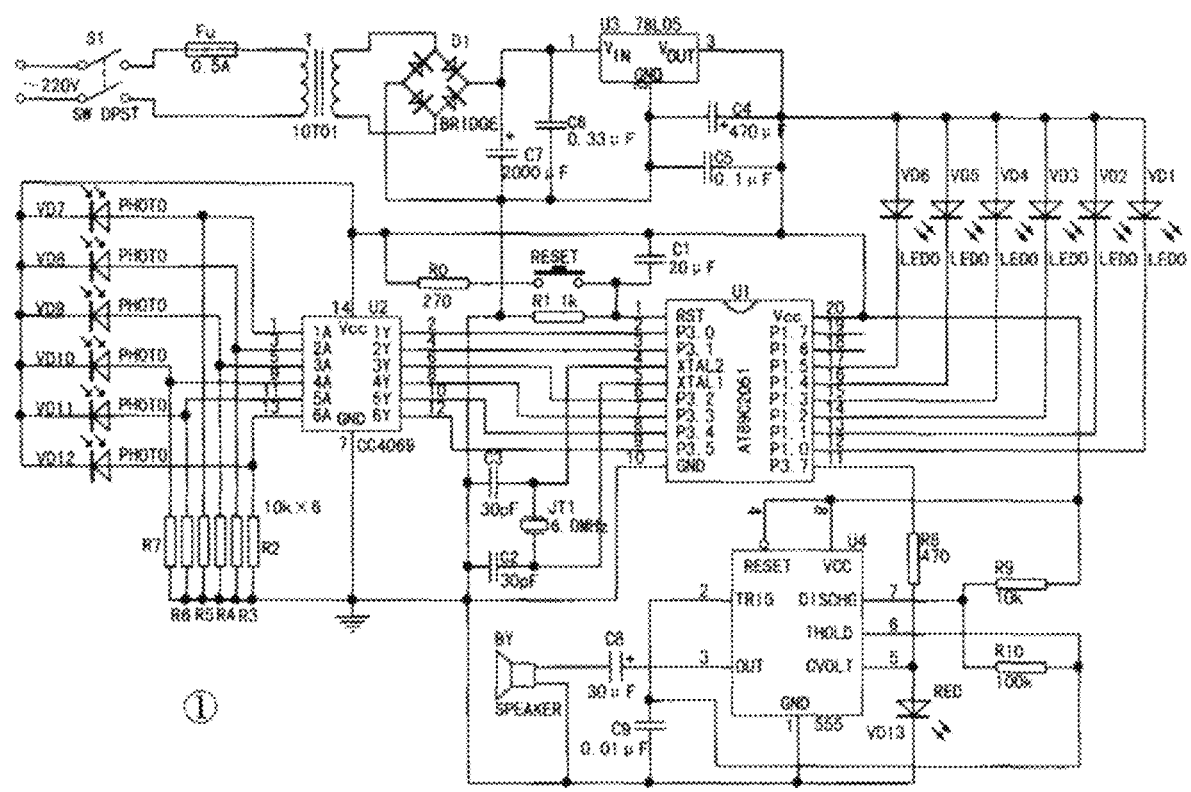
FIG. 3 is a schematic diagram of the baffle structure provided by an embodiment of the present invention.

The wall and the mice feeding box use high-tech baffle. The route map of the infrared alarm that inside the baffle as shown in FIG. 3. The baffle is made of special material (the special material is a combination of $LiTaO_3$, LATGS and PZT, which is on the piezoelectric crystal such as titanium zirconate, with electrodes on the upper and lower surfaces, and a black film is added to the surface. When infrared light is intermittently illuminated, the temperature of the surface is rising, which causing the change of the arrangement of atoms that inside the crystal, that is, resulting in spontaneous polarization charges. This phenomenon is called the pyroelectric effect, which is one of the thermoelectric effects. The surface charge generated by the pyroelectric effect is temporary, and as soon as it appears, it is quickly neutralized by various ions in the air).

The embodiment of the present invention is equipped with active infrared alarm device, specifically pyroelectric infrared sensor, the alarm actively emits infrared rays, set the restraint time for 30 minutes through the computer software, and after boot up the program. If the bottle leaves the baffle, the infrared rays bounce back when encountering obstacles, which is received by the probe of the alarm and emits alarm to reduce the moving space of mice.

The embodiment of the present invention also provides a single factor modeling-constraint device for mice chronic fatigue syndrome, includes: computer, cardboard, baffles and the mineral water bottle;

Turn on the wireless cardboard and the baffle operation panel, and boot up the computer, set the operation parameters. Cover the mice through the opening of the segmented part of the mineral water bottle and make it touch the baffle as much as possible. Control the computer to start timing function, which is 30 minutes. After the timing starts, the computer controls the corresponding material in the baffle to tightly suck the plastic bottle to prevent mice to escape;

During the restraint period, the baffle plays monitoring and alarm function, and can remote observe the restraint situation by computer. If the mouse breaks free, the baffle will promptly transmit the signal to computer to alarm. After 30 minutes of restraint is over, the computer receives signal, and to remind in time. At the same time, the corresponding material's function in the baffle is dismissed, which can depart the plastic bottle and the baffle.

When using traditional mice restraint cages in the experiment, due to the limitation of human and financial resources, mice can easily break free from the restraint cage, which needs experimental person to watch all the time. Resulting in low experimental efficiency and inability to complete experimental tasks on time every day. After using the present invention, sufficient restraint cages can be made according to specific experimental tasks, which can complete the restraint tasks. During the restraint period, the experimental person can remotely control and observe the state of the mice, without worrying about the mice breaking out from the restraint cage. The experimental efficiency is greatly improved, and the experimental effect is good.

From the previous experimental data, using the present invention to restraint the experimental group mice, the results of the eight arms experiment show a statistically significant difference compared with the control group, indicating that the restraint effect of the present invention is good.

Figure 5:
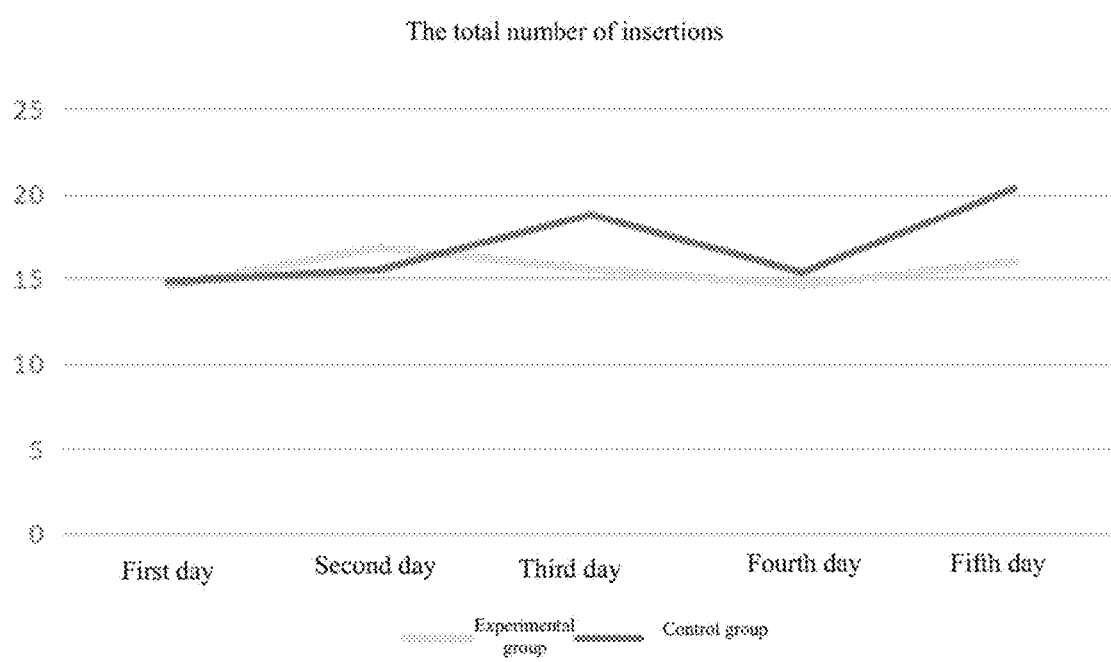
FIG. 5 is an experimental effect diagram of the application of an embodiment of the present invention.

As shown in FIG. 5, it can be seen from the experimental results graph, except the second day, the eight arm experimental results of the control group were better than the experimental groups, and the total number of arm insertion is more than the experimental groups, indicating that using this method to model has good effect and is success to restraint.

The described embodiments are only specific embodiments of the present invention, but the scope of the protection is not limited by the above-mentioned. Any person skilled in the art in the technical scope of the present invention disclosed, any modifications, equivalent replacements and improvements within the spirit and principles of the present invention should be involved in the scope of protection of the present invention.

What is claimed is:

1. A single factor modeling-constraint device for mice chronic fatigue syndrome, the single factor modeling-constraint device for mice chronic fatigue syndrome using a mineral water bottle to restrain mice;
   the mineral water bottle is divided into upper, middle and lower parts, which are part A, part B and part C respectively to restrain mice;
   a body of the mineral water bottle is equipped with holes for mice to breathe;
   a height of part A, part B and part C of mineral water bottle are the same;
   an inner of part A, part B and part C which are divided by the body of mineral water bottle is individually blocked by a cardboard to reduce a moving space of mice;
   a baffle is set on a surface of the cardboard, the baffle is made from a special material including an active infrared alarm device, wherein the active infrared alarm device is a pyroelectric infrared sensor, wherein the active infrared alarm device is configured to actively emit infrared rays, set a restraint time for 30 minutes through a computer software, and after boot up a program; if the mineral water bottle leaves the baffle, the infrared rays bounce back when encountering obstacles and are detected by a probe of the active infrared alarm device and emits alarm to reduce the moving space of mice; the special material is a combination of $LiTaO_3$, LATGS and PZT.

2. The single factor modeling-constraint device for mice chronic fatigue syndrome according to claim 1, wherein the cardboard is equipped with holes for mice to breathe, and a shape of the cardboard comprises quadrilateral, triangle, and rhombus.

3. The single factor modeling-constraint device for mice chronic fatigue syndrome according to claim 1, wherein the part A, part B and part C are respectively placed on a same horizontal plane, one end of the part A, part B and part C is attached to the obstacles, and the other end of the part A, part B and part C is attached to a mice feeding box.

4. The single factor modeling-constraint device for mice chronic fatigue syndrome according to claim 3, wherein the mice feeding box comprises box baffle, the box baffle is made from the same special material with the baffle used on the cardboard.

* * * * *